US010127188B2

(12) United States Patent
Bastide et al.

(10) Patent No.: US 10,127,188 B2
(45) Date of Patent: Nov. 13, 2018

(54) DISPLAYING CALENDAR INFORMATION IN A HORIZONTAL BAR

(71) Applicant: International Business Machines Corporation, Armonk, NY (US)

(72) Inventors: Paul R. Bastide, Boxford, MA (US); Andrew E. Davis, Arlington, MA (US); Margo L. Ezekiel, Newton, MA (US); Leah A. Lawrence, Austin, TX (US); Katherine M. Parsons, Austin, TX (US); Jodi Rajaniemi, Merrimack, NH (US)

(73) Assignee: International Business Machines Corporation, Armonk, NY (US)

( * ) Notice: Subject to any disclaimer, the term of this patent is extended or adjusted under 35 U.S.C. 154(b) by 686 days.

(21) Appl. No.: 14/731,965

(22) Filed: Jun. 5, 2015

(65) Prior Publication Data
US 2016/0358125 A1 Dec. 8, 2016

(51) Int. Cl.
*G06F 15/00* (2006.01)
*G06F 15/02* (2006.01)
*G06Q 10/10* (2012.01)
*G06Q 10/06* (2012.01)
*G06F 9/451* (2018.01)
*G06F 3/0482* (2013.01)

(52) U.S. Cl.
CPC ........ *G06F 15/0266* (2013.01); *G06F 3/0482* (2013.01); *G06F 9/451* (2018.02); *G06Q 10/06* (2013.01); *G06Q 10/1095* (2013.01); *Y10S 715/963* (2013.01); *Y10S 715/974* (2013.01)

(58) Field of Classification Search
None
See application file for complete search history.

(56) References Cited

U.S. PATENT DOCUMENTS

| 5,129,057 A * | 7/1992 | Strope ................. G06F 15/0266 345/629 |
| 7,757,181 B2 | 7/2010 | Pan et al. |
| 2006/0236269 A1 | 10/2006 | Borna |

(Continued)

OTHER PUBLICATIONS

Faulring, Andrew, and Brad A. Myers. "Visualizing and manipulating complex calendar scheduling information." Submitted to InfoVIS (2006).*

(Continued)

*Primary Examiner* — Gurkanwaljit Singh
(74) *Attorney, Agent, or Firm* — Robert A. Voigt, Jr.; Winstead, P.C.

(57) ABSTRACT

A method, system and computer program product for improving the usability of a calendar application. A calendar client agent receives calendar information, such as meetings, appointments, vacations, tasks, etc. from various systems, such as an electronic mail system, a social networking system, an instant messaging system and a wiki. The calendar client agent evaluates the retrieved calendar information with respect to a set of presentation rules. The calendar client agent then presents the retrieved calendar information in a horizontal bar (also referred to as a "calendar bar") in the calendar application over a duration of time (e.g., twelve hours of the current day) in relation to the set of presentation rules. In this manner, the user will be able to more easily ascertain which events or activities are scheduled.

20 Claims, 7 Drawing Sheets

(56) References Cited

U.S. PATENT DOCUMENTS

| | | | |
|---|---|---|---|
| 2008/0034047 A1 | 2/2008 | Rosenberg et al. | |
| 2009/0070708 A1* | 3/2009 | Finkelstein | G06F 9/4443 715/789 |
| 2009/0192702 A1* | 7/2009 | Bourne | G01C 21/20 701/532 |
| 2014/0059487 A1* | 2/2014 | Baumann | G06F 3/0482 715/811 |
| 2014/0082521 A1 | 3/2014 | Carolan et al. | |
| 2014/0149913 A1 | 5/2014 | Gauthier et al. | |
| 2014/0365107 A1* | 12/2014 | Dutta | G01C 21/343 701/408 |

OTHER PUBLICATIONS

Luz, Saturnino, and Masood Masoodian. "Comparing static Gantt and mosaic charts for visualization of task schedules." Information Visualisation (IV), 2011 15th International Conference on. IEEE, 2011.*

Tullio, Joe, et al. "Augmenting shared personal calendars." Proceedings of the 15th annual ACM symposium on User interface software and technology. ACM, 2002.*

Jon Guerrera, "How to Gamify Your Life: An Experiment—Part 4," http://www.livingforimprovement.com/how-to-gamify-your-life-an-experiment-part-4, Jan. 15, 2012, pp. 1-14.

Ivan Kuo, "How to Gamify Your Goals: A Step by Step Guide," http://www.gamification.co/2013/01/02/how-to-gamify-your-goals-a-step-by-step-guide, Jan. 2, 2013, pp. 1-7.

Marissa Brassfield, "3 Ways to Gamify Your Day," http://ridiculouslyefficient.com/gamify-your-day, Jan. 14, 2012, pp. 1-10.

Neustaedter et al., "The Calendar is Crucial: Coordination and Awareness through the Family Calendar," ACM Transactions on Computer-Human Interaction, vol. 16, No. 1, Article 6, Apr. 2009, pp. 1-48.

IBM, "SPSS Text Analytics for Surveys," http://www-01.ibm.com/software/analytics/spss/products/statistics/text-analytics-for-surveys, 2014, pp. 1-3.

IBM, "IBM SPSS Statistics," http://www-01.ibm.com/software/analytics/spss/products/statistics, 2014, pp. 1-2.

Wikipedia, "Natural Language Processing," http://en.wikipedia.org/wiki/Natural_language_processing, 2014, pp. 1-10.

* cited by examiner

DISPLAYING CALENDAR INFORMATION IN A HORIZONTAL BAR

TECHNICAL FIELD

The present invention relates generally to calendaring systems, and more particularly to improving the usability of a calendar application by displaying calendar information in a horizontal bar.

BACKGROUND

Calendaring systems, in the simplest form, help users to organize their time. Additionally, calendaring systems may be used to schedule meetings, appointments, vacations or other types of calendar events or activities.

However, users may have difficulty in ascertaining the events or activities that are scheduled throughout the day in current calendaring systems. For example, in a "day-at-a glance" view, the user may only view a portion of the events or activities scheduled for that day. The user may then have to scroll upwards or downwards to view all the events or activities scheduled for that day. Furthermore, such events or activities may be difficult to ascertain if there are a large number of scheduled events or activities, especially if some of these events or activities are scheduled in conflict with one another.

Furthermore, in current calendaring systems, if the user desires to view the scheduled events or activities in other days, the user may have to switch between the "day-at-a-glance" view to the "monthly calendar" view and then select the day of interest in order to view the events or activities scheduled for that day in the "day-at-a-glance" view. Such a process is laborsome without ease of functionality.

Hence, current calendaring systems are deficient in enabling users to easily ascertain the events or activities scheduled for the days of interest.

BRIEF SUMMARY

In one embodiment of the present invention, a method for improving the usability of a calendar application comprises retrieving, by a processor, calendar information. The method further comprises presenting, by the processor, the retrieved calendar information in a horizontal bar in the calendar application over a duration of time. The method additionally comprises detecting a current time. Furthermore, the method comprises automatically scrolling to the current time in the horizontal bar such that items in the horizontal bar that occur prior to the current time are less visible than items in the horizontal bar that occur after the current time.

Other forms of the embodiment of the method described above are in a system and in a computer program product.

The foregoing has outlined rather generally the features and technical advantages of one or more embodiments of the present invention in order that the detailed description of the present invention that follows may be better understood. Additional features and advantages of the present invention will be described hereinafter which may form the subject of the claims of the present invention.

BRIEF DESCRIPTION OF THE DRAWINGS

A better understanding of the present invention can be obtained when the following detailed description is considered in conjunction with the following drawings, in which.

DETAILED DESCRIPTION

The present invention comprises a method, system and computer program product for improving the usability of a calendar application. In one embodiment of the present invention, a calendar client agent receives calendar information, such as meetings, appointments, vacations, tasks, etc. from various systems, such as an electronic mail system, a social networking system, an instant messaging system and a wiki. The calendar client agent evaluates the retrieved calendar information with respect to a set of presentation rules. "Presentation rules," as used herein, refer to rules that are used for determining how the calendar information, such as meetings, appointments, vacations, tasks, etc. are to be displayed on the user interface of the client device. For example, calendar information that relates to a past event or activity is shaded or grayed out so that past events or activities are less visible than future events or activities. The calendar client agent then presents the retrieved calendar information in a horizontal bar (also referred to as a "calendar bar") in the calendar application over a duration of time (e.g., twelve hours of the current day) in relation to the set of presentation rules. In this manner, the user will be able to more easily ascertain which events or activities are scheduled.

In the following description, numerous specific details are set forth to provide a thorough understanding of the present invention. However, it will be apparent to those skilled in the art that the present invention may be practiced without such specific details. In other instances, well-known circuits have been shown in block diagram form in order not to obscure the present invention in unnecessary detail. For the most part, details considering timing considerations and the like have been omitted inasmuch as such details are not necessary to obtain a complete understanding of the present invention and are within the skills of persons of ordinary skill in the relevant art.

Figure 1:
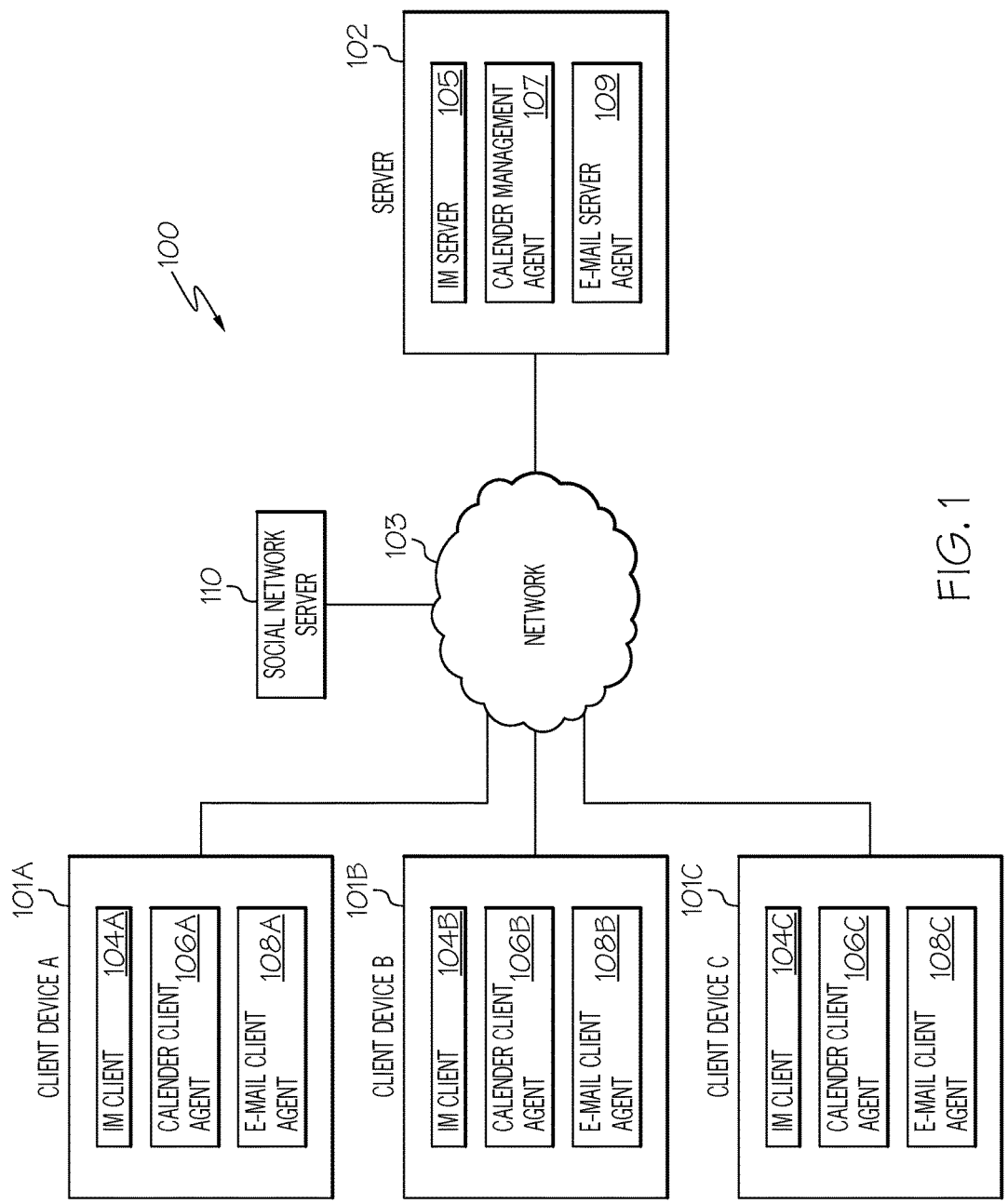
FIG. 1 illustrates a communication system configured in accordance with an embodiment of the present invention.

Referring now to the Figures in detail, FIG. 1 illustrates a communication system 100 for practicing the principles of the present invention in accordance with an embodiment of the present invention. Communication system 100 includes client devices 101A-101C (identified as "Client Device A," "Client Device B," and "Client Device C," respectively, in FIG. 1) connected to a server 102 via a network 103. Client devices 101A-101C may collectively or individually be referred to as client devices 101 or client device 101, respectively. Client device 101 may be any type of computing device (e.g., portable computing unit, Personal Digital Assistant (PDA), smartphone, laptop computer, mobile phone, navigation device, game console, desktop computer system, workstation, Internet appliance and the like) configured with the capability of connecting to network 103 and consequently communicating with other client devices 101 and server 102. Client device 101 may be configured to send and receive text-based messages in real-time during an instant messaging session. Any user of client devices 101 may be the creator or initiator of an instant message (message in instant messaging) and any user of client devices 101 may be a recipient of an instant message. Furthermore, client device 101 may be configured to send out calendar appointments or meeting notices/invitations to other client devices 101 using a calendar application via network 103. Any user of client devices 101 may be the creator or initiator of a meeting invitation and any user of client devices 101 may be a recipient of a meeting invitation. Additionally, client device 101 may be configured to create, receive and send e-mails. A description of the hardware configuration of client device 101 is provided below in connection with FIG. 2.

Network 103 may be, for example, a local area network, a wide area network, a wireless wide area network, a circuit-switched telephone network, a Global System for Mobile Communications (GSM) network, Wireless Application Protocol (WAP) network, a WiFi network, an IEEE 802.11 standards network, various combinations thereof, etc. Other networks, whose descriptions are omitted here for brevity, may also be used in conjunction with system 100 of FIG. 1 without departing from the scope of the present invention.

In communication system 100, client devices 101A-101C include a software agent, referred to herein as an Instant Messaging (IM) client 104A-104C, respectively. Instant messaging clients 104A-104C may collectively or individually be referred to as instant messaging clients 104 or instant messaging client 104, respectively. Furthermore, server 102 includes a software agent, referred to herein as the Instant Messaging (IM) server 105. IM client 104 provides the functionality to send and receive instant messages. As messages are received, IM client 104 presents the messages to the user in a dialog window (or IM window). Furthermore, IM client 104 provides the functionality for client device 101 to connect to the IM server 105 which provides the functionality of distributing the instant messages to the IM clients 104 associated with each of the sharing users.

Client devices 101A-101C may further include a software agent, referred to herein as a calendar client agent 106A-106C, respectively. Calendar client agents 106A-106C may collectively or individually be referred to as calendar client agents 106 or calendar client agent 106, respectively. Furthermore, server 102 may include a software agent, referred to herein as the calendar management agent 107. Calendar management agent 107 interfaces with calendar client agent 106 to present meeting invitations to client devices 101. Calendar client agent 106 is configured to display the received meeting invitation as well as display calendar schedule information on the client device's 101 calendar user interface. Furthermore, as discussed further below, calendar client agent 106 is configured to improve the usability of the calendar application by displaying calendar information in a horizontal bar as discussed further below in connection with FIGS. 3-5 and 6A-6B.

Furthermore, client devices 101A-101C may include a software agent, referred to herein as an e-mail client agent 108A-108C, respectively. E-mail client agents 108A-108C may collectively or individually be referred to as e-mail client agents 108 or e-mail client agent 108, respectively. Furthermore, server 102 may include a software agent, referred to herein as the e-mail server agent 109. E-mail client agent 108 enables the user of client device 101 to create, send and receive e-mails. E-mail server agent 109 is configured to receive e-mail messages from client devices 101 and distribute the received e-mail messages among the one or more client devices 101.

While the preceding discusses each client device 101 as including an IM client 104, a calendar client agent 106 and an e-mail client agent 108, each client device 101 may not necessarily include each of these software agents, but only a subset of these software agents. Furthermore, while the preceding discusses a single server 102 including the software agents, such as IM server 105, calendar management agent 107 and e-mail server agent 109, multiple servers may be used to implement these services. Furthermore, each server 102 may not necessarily be configured to include all of these software agents, but only a subset of these software agents.

System 100 further includes a social network server 110, which may be a web server configured to offer a social networking and/or microblogging service, enabling users of client devices 101 to send and read other users' posts. "Posts," as used herein, include any one or more of the following: text (e.g., comments, sub-comments and replies), audio, video images, etc. Social network server 110 is connected to network 103 by wire or wirelessly. While FIG. 1 illustrates a single social network server 110, it is noted for clarity that multiple servers may be used to implement the social networking and/or microblogging service.

System 100 is not to be limited in scope to any one particular network architecture. System 100 may include any number of client devices 101, servers 102, networks 103 and social network servers 110.

Figure 2:
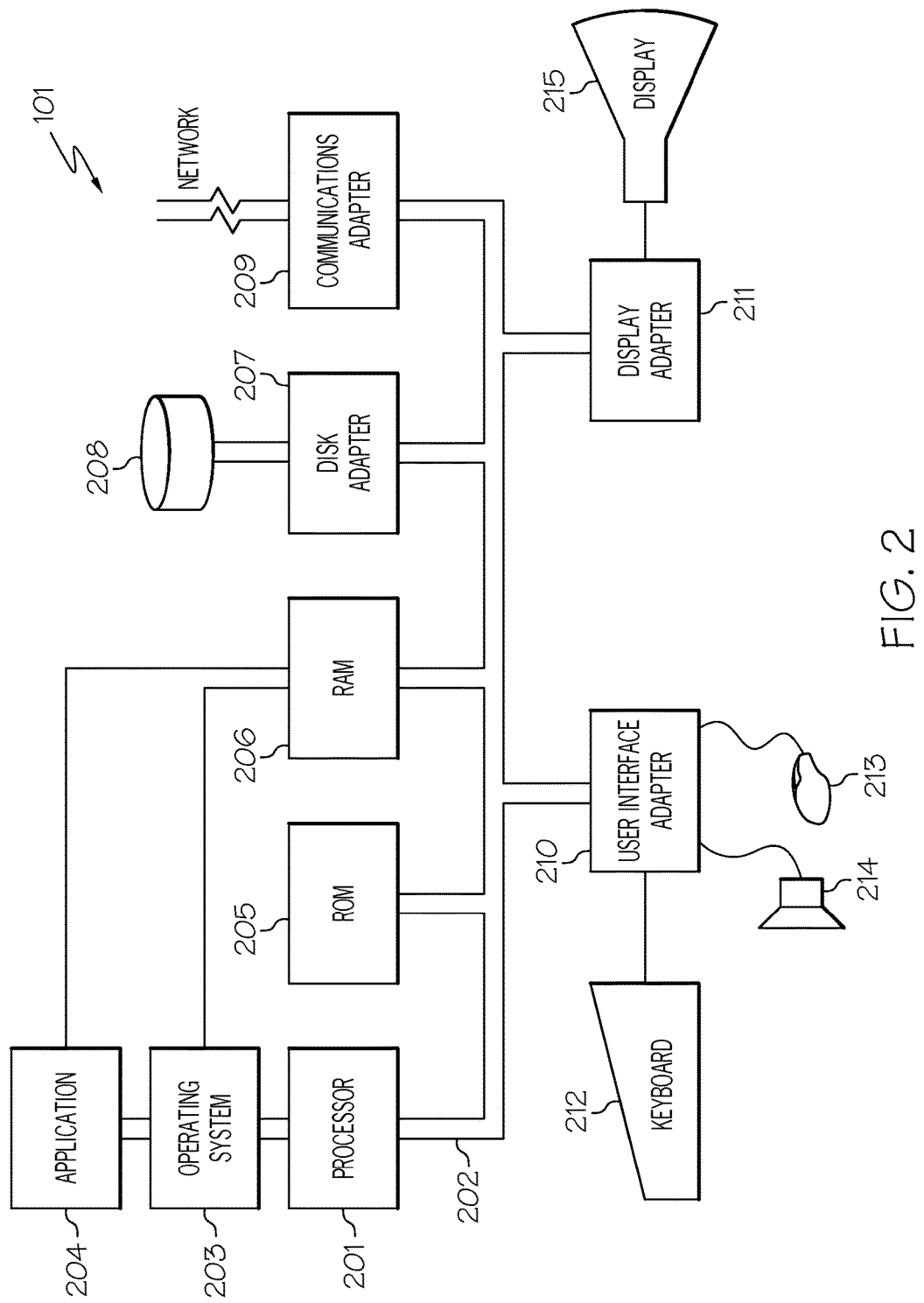
FIG. 2 illustrates a hardware configuration of a client device in accordance with an embodiment of the present invention.

Referring now to FIG. 2, FIG. 2 illustrates a hardware configuration of client device 101 (FIG. 1) which is representative of a hardware environment for practicing the present invention. Referring to FIG. 2, client device 101 has a processor 201 coupled to various other components by system bus 202. An operating system 203 runs on processor 201 and provides control and coordinates the functions of the various components of FIG. 2. An application 204 in accordance with the principles of the present invention runs in conjunction with operating system 203 and provides calls to operating system 203 where the calls implement the various functions or services to be performed by application 204. Application 204 may include, for example, calendar client agent 106 (FIG. 1) for improving the usability of the calendar application by displaying calendar information in a horizontal bar as discussed further below in connection with FIGS. 3-5 and 6A-6B.

Referring again to FIG. 2, read-only memory ("ROM") 205 is coupled to system bus 202 and includes a basic input/output system ("BIOS") that controls certain basic functions of client device 101. Random access memory ("RAM") 206 and disk adapter 207 are also coupled to system bus 202. It should be noted that software components including operating system 203 and application 204 may be loaded into RAM 206, which may be client device's 101 main memory for execution. Disk adapter 207 may be an integrated drive electronics ("IDE") adapter that communicates with a disk unit 208, e.g., disk drive.

Client device 101 may further include a communications adapter 209 coupled to bus 202. Communications adapter 209 interconnects bus 202 with an outside network (e.g., network 103 of FIG. 1) thereby enabling client device 101 to communicate with other client devices 101, server 102 and social network server 110.

I/O devices may also be connected to client device 101 via a user interface adapter 210 and a display adapter 211. Keyboard 212, mouse 213 and speaker 214 may all be interconnected to bus 202 through user interface adapter 210. A display monitor 215 may be connected to system bus 202 by display adapter 211. In this manner, a user is capable of inputting to client device 101 through keyboard 212 or mouse 213 and receiving output from client device 101 via display 215 or speaker 214. Other input mechanisms may be used to input data to client device 101 that are not shown in FIG. 2, such as display 215 having touch-screen capability and keyboard 212 being a virtual keyboard. Client device 101 of FIG. 2 is not to be limited in scope to the elements depicted in FIG. 2 and may include fewer or additional elements than depicted in FIG. 2.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

As stated in the Background section, calendaring systems, in the simplest form, help users to organize their time. Additionally, calendaring systems may be used to schedule meetings, appointments, vacations or other types of calendar events or activities. However, users may have difficulty in ascertaining the events or activities that are scheduled throughout the day in current calendaring systems, including project management systems and customer relationship management systems. For example, in a "day-at-a glance" view, the user may only view a portion of the events or activities scheduled for that day. The user may then have to scroll upwards or downwards to view all the events or activities scheduled for that day. Furthermore, such events or activities may be difficult to ascertain if there are a large number of scheduled events or activities, especially if some of these events or activities are scheduled in conflict with one another. Furthermore, in current calendaring systems, if the user desires to view the scheduled events or activities in other days, the user may have to switch between the "day-at-a-glance" view to the "monthly calendar" view and then select the day of interest in order to view the events or activities scheduled for that day in the "day-at-a-glance" view. Such a process is laborsome without ease of functionality. Hence, current calendaring systems are deficient in enabling users to easily ascertain the events or activities scheduled for the days of interest.

Figure 3:
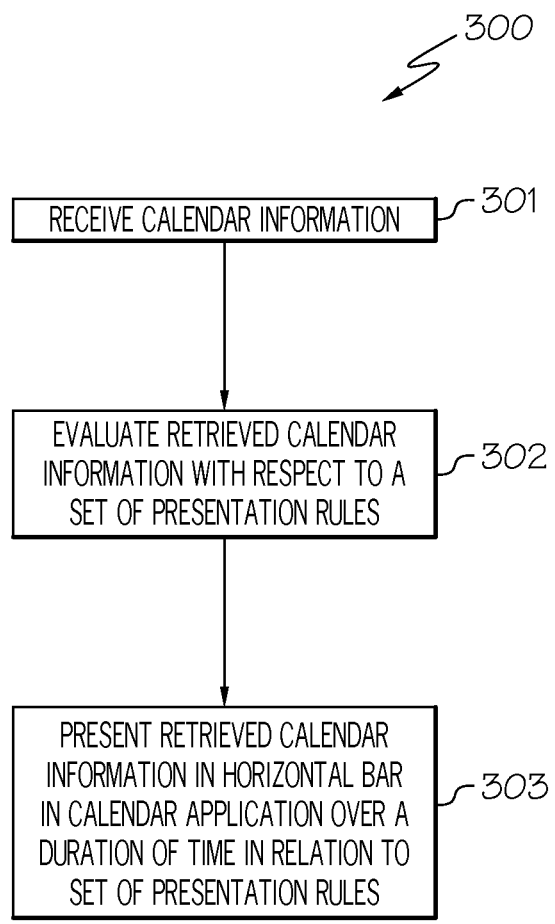
FIG. 3 is a flowchart of a method for improving the usability of a calendar application by displaying calendar information in a horizontal bar in accordance with an embodiment of the present invention.
Figure 4:
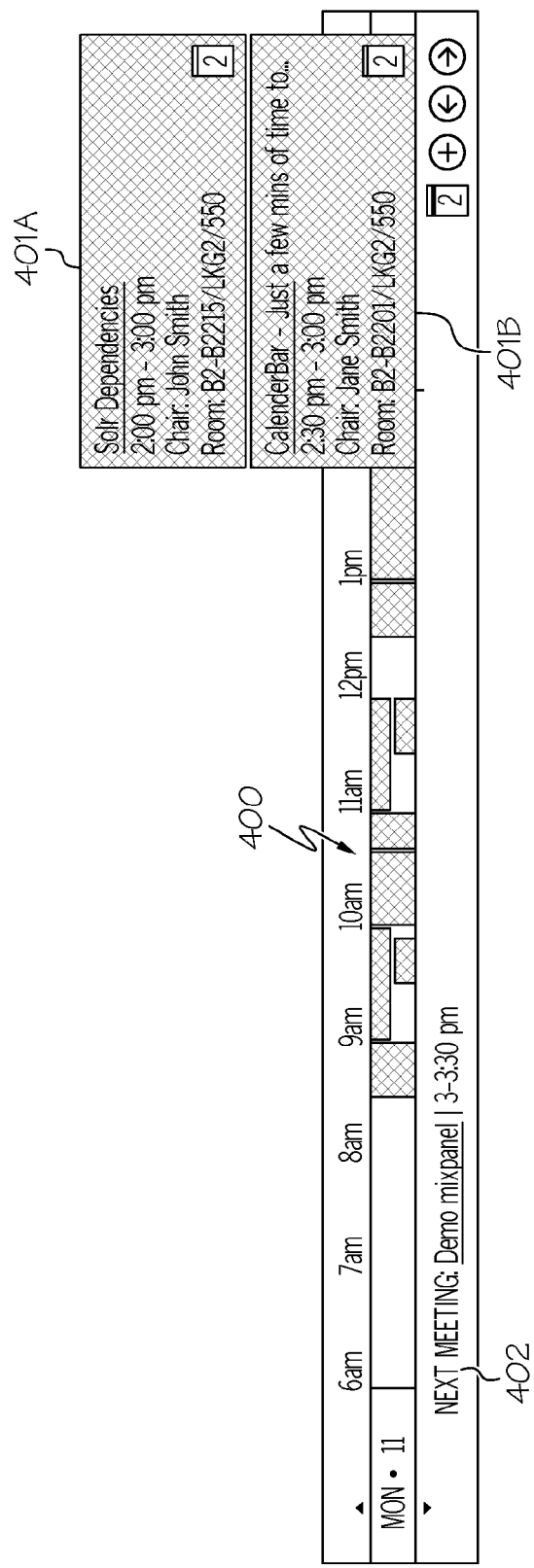
FIG. 4 illustrates the presentation of calendar information in a horizontal bar in accordance with an embodiment of the present invention.
Figure 5:
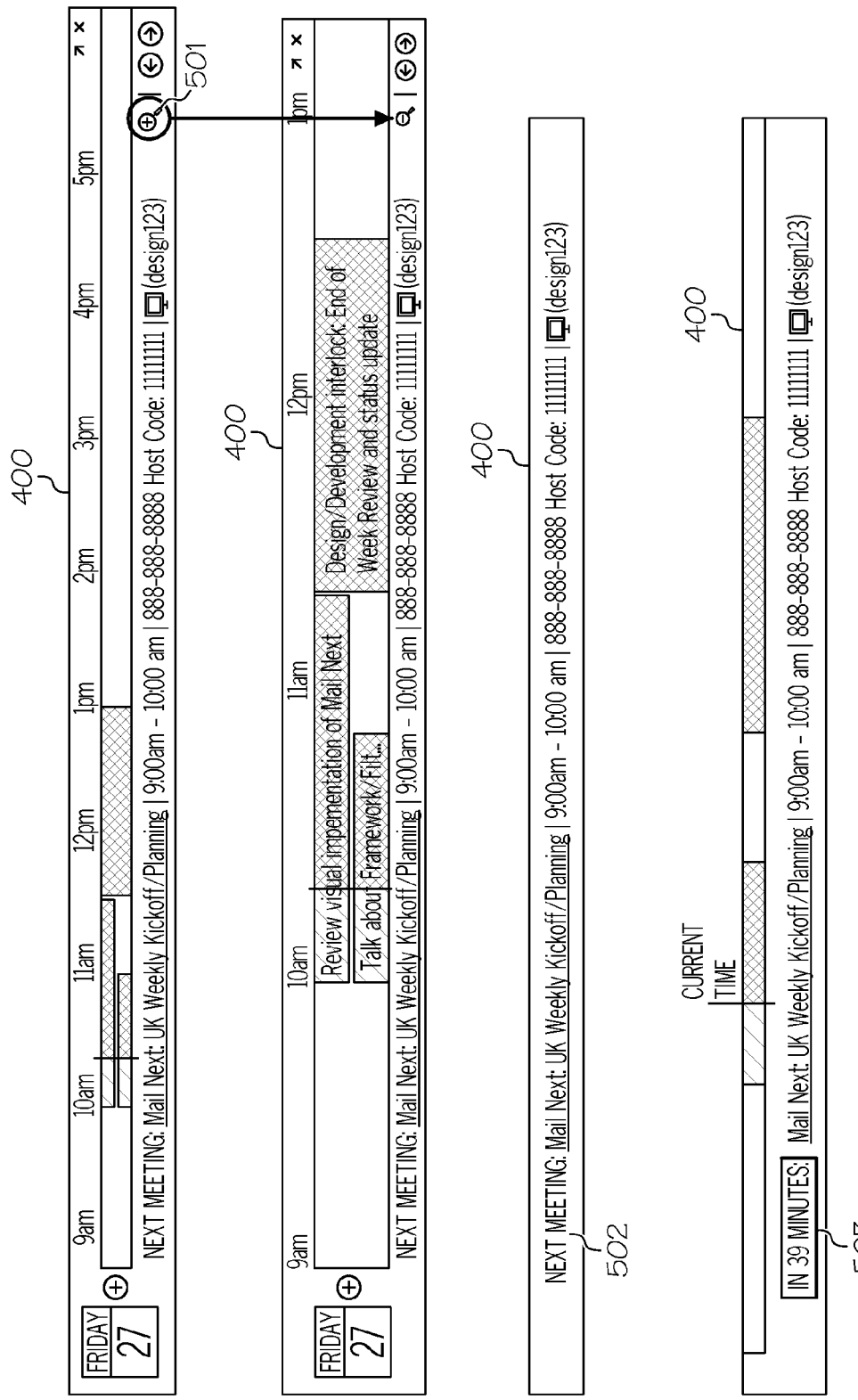
FIG. 5 illustrates various features of the horizontal bar in accordance with an embodiment of the present invention.
Figure 6A:
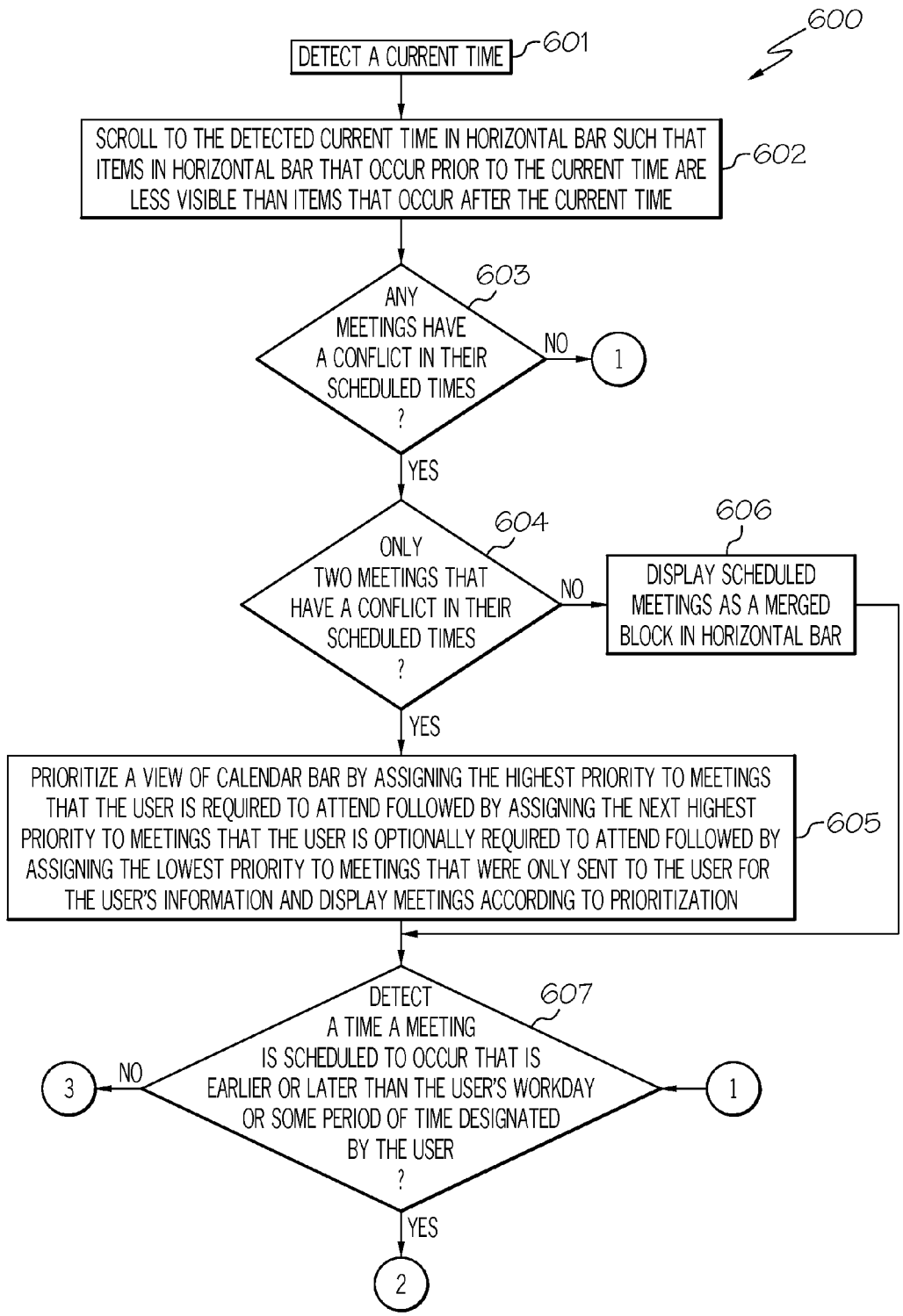
FIGS. 6A-6B are a flowchart of a method for displaying calendar information in the horizontal bar in accordance with an embodiment of the present invention.
Figure 6B:
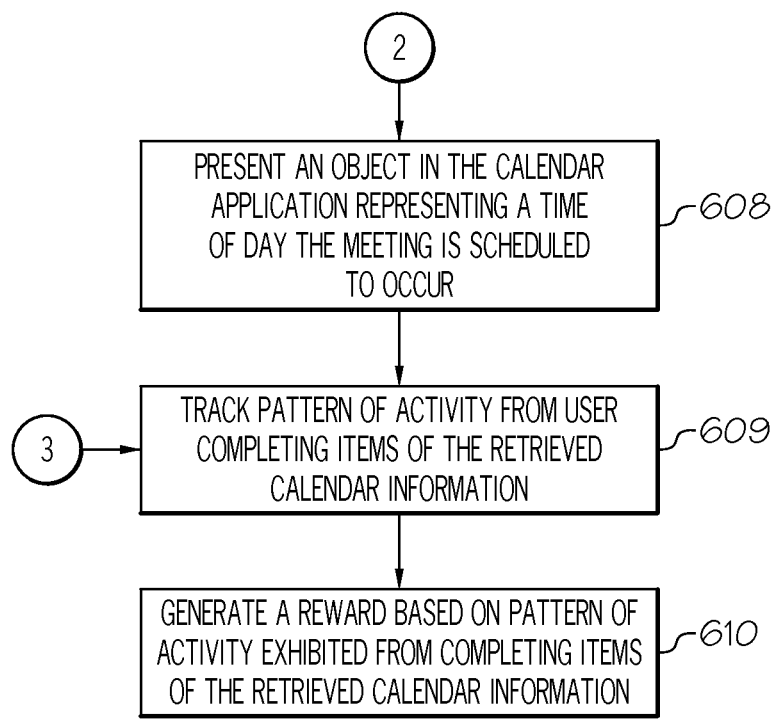

The principles of the present invention provide a means for enabling users to easily ascertain the events or activities scheduled for the days of interest by displaying calendar information in a horizontal bar as discussed below in connection with FIGS. 3-5 and 6A-6B. FIG. 3 illustrates a flowchart of a method for improving the usability of a calendar application by displaying calendar information in a horizontal bar. FIG. 4 illustrates the presentation of calendar information in a horizontal bar. FIG. 5 illustrates various features of the horizontal bar. FIGS. 6A-6B are a flowchart of a method for displaying calendar information in the horizontal bar.

As stated above, FIG. 3 illustrates a flowchart of a method 300 for improving the usability of a calendar application by displaying calendar information in a horizontal bar in accordance with an embodiment of the present invention.

Referring to FIG. 3, in conjunction with FIGS. 1-2, in step 301, calendar client agent 106 receives calendar information, such as meetings, appointments, vacations, tasks, etc. from various systems, such as an electronic mail system, a social networking system, an instant messaging system, a wiki, a project management system and a customer relationship management system.

In step 302, calendar client agent 106 evaluates the retrieved calendar information with respect to a set of presentation rules. "Presentation rules," as used herein, refer to rules that are used for determining how the calendar information, such as meetings, appointments, vacations, tasks, etc. are to be displayed on the user interface of client device 101. For example, as will be discussed further below, calendar information that relates to a past event or activity is shaded or grayed out so that past events or activities are less visible than future events or activities.

In step 303, calendar client agent 106 presents the retrieved calendar information in a horizontal bar (also referred to as a "calendar bar") in the calendar application over a duration of time (e.g., twelve hours of the current day) in relation to the set of presentation rules as illustrated in FIG. 4. In this manner, the user will be able to more easily ascertain which events or activities are scheduled as discussed further below.

FIG. 4 illustrates the presentation of calendar information in a horizontal bar 400 in accordance with an embodiment of the present invention.

Referring to FIG. 4, in conjunction with FIGS. 1-3, horizontal bar 400 presents the calendar information in a manner that is easier for the user to comprehend thereby allowing the user to easily ascertain the scheduled upcoming events or activities as well as the user's free time. In one embodiment, horizontal bar 400 is limited to two rows on the user's interface of client device 101, such that conflicting meetings 401A, 401B (discussed further below) will take up the maximum of two rows on the user's interface. Other features of horizontal bar 400 include displaying a notification of the next meeting 402 as well as the time of this meeting that occurs following the time period of horizontal bar 400 (e.g., displays events and activities from 6 am to 3 pm on Monday the 11$^{th}$). In one embodiment, the notification of the next meeting 402 corresponds to the first meeting of the next day.

In one embodiment, a user may reschedule a meeting using horizontal bar 400 by moving the edge of calendar bar 400 over the border of another meeting.

In one embodiment, the user may view other users' calendar information in horizontal bar 400. For example, the user may switch the view from viewing the user's calendar information in horizontal bar 400 to viewing another user's (e.g., secretary) calendar information (e.g., tasks, activities, free-time) in horizontal bar 400 assuming that the user has permission to do so.

Furthermore, in one embodiment, horizontal bar 400 may depict the calendar information for a group of users (e.g., community of users) assuming that each user of the group gave permission to display their calendar information.

In one embodiment, calendar bar 400 is updated in real-time in response to changes in the user's scheduled events or activities. For example, a cancelled meeting is automatically removed from calendar bar 400.

In one embodiment, upon the user selecting a meeting, calendar client agent 106 may display the total availability of users to attend the meeting.

Other features of horizontal bar 400 include the ability to zoom into a period of time (e.g., 10 am-12 pm) of the day depicted in horizontal bar 400 as illustrated in FIG. 5.

FIG. 5 illustrates various features of horizontal bar 400 in accordance with an embodiment of the present invention.

Referring to FIG. 5, a user may zoom into a period of time (e.g., 10 am-12 pm) of the day depicted in horizontal bar 400 via a zoom icon 501 thereby allowing the user to view the details during that period of time.

Additionally, as illustrated in FIG. 5, items in horizontal bar 400 that occur prior to the current time (10:15 am) are less visible (shaded lighter) than items that occur after the current time.

Furthermore, horizontal bar 400 provides the user with all of the information the user needs to join a meeting quickly, such as the time of the meeting and the telephone number and passcode used to join a teleconference meeting as shown in element 502. Other information that may be shown to the user includes a link to launch the start of a web conference meeting.

Additionally, horizontal bar 400 may display an indication 503 when a meeting is to occur 60 minutes or less from the current time thereby drawing the user's attention to a meeting that will be occurring in the near-term. Such an indication 503 may be a countdown to the start of the next meeting.

Other features of horizontal bar 400 include scrolling through the hours/days/weeks by going forward and background across horizontal bar 400.

Various other features of horizontal bar 400 will be discussed below in connection with FIGS. 6A-6B.

FIGS. 6A-6B are a flowchart of a method 600 for displaying calendar information in horizontal bar 400, such as after the user of client device 101 initiates the calendar application, in accordance with an embodiment of the present invention.

Referring to FIG. 6A, in conjunction with FIGS. 1-5, in step 601, calendar client agent 106 detects a current time.

In step 602, calendar client agents 106 automatically scrolls to the detected current time in horizontal bar 400 such that items in horizontal bar 400 that occur prior to the current time are less visible than items that occur after the current time as illustrated in FIG. 5. Items that occur after the current time are presented in a more visible manner, such as via color, font size, etc.

In step 603, a determination is made by calendar client agent 106 as to whether any meetings (meetings in the future) have a conflict in their scheduled times.

If there are meetings that have a conflict in their scheduled times, then, in step 604, a determination is made by calendar client agent 106 as to whether there are only two meetings that have a conflict in their scheduled times.

If there are only two meetings that have a conflict in their scheduled times, then in step 605, calendar agent 106 prioritizes a view of calendar bar 400 by assigning the highest priority to meetings that the user is required to attend followed by assigning the next highest priority to meetings that the user is optionally required to attend followed by assigning the lowest priority to meetings that were only sent to the user for the user's information and displaying the meetings according to the prioritization. In one embodiment, higher prioritized meetings are shown above a lower prioritized meeting. For example, as illustrated in FIG. 4, calendar client agent displays the notice 401A of a first meeting the user is required to attend in horizontal bar 400 on top of the image of the notice 401B of a second meeting that the user is not required to attend, such as being optionally required to attend.

Alternatively, calendar agent 106 prioritizes a view of calendar bar 400 by assigning the highest priority to meetings where the user is the chair of the meeting followed by assigning the next highest priority to meetings where the user is required to attend followed by assigning the next highest priority to meetings where the chair of the meeting is an individual whose meetings the user wants to attend followed by assigning the lowest priority to meetings when there are fewer than a threshold number of people attending. In one embodiment, calendar agent 106 may determine which meetings chaired by specific individuals the user desires to attend either by having the user directly input such information, such as via a profile, or via social media. For example, if the user indicated that he/she enjoys attending meetings chaired by a specific individual on the user's social media homepage, then calendar agent 106 may deem the user to have a high interest in attending meetings chaired by such an individual.

In one embodiment, the user has an opportunity to override any prioritizations established by calendar agent 106, such as via a graphical user object displayed on display 215 that indicates to assign a specific priority (e.g., highest priority) to a meeting in question.

If, however, there are more than two meetings that have a conflict in their scheduled times, then, in step 606, calendar client agent 106 displays the scheduled meetings as a merged block in horizontal bar 400.

Upon displaying the scheduled meetings in step 605 or step 606, or if there are no meetings that have a conflict in their scheduled times, then, in step 607, a determination is made by calendar client agent 106 as to whether it detected a time a meeting is scheduled to occur (from the retrieved calendar information) that is earlier or later than the user's workday or some period of time (e.g., 8 am-6 pm) designated by the user.

Referring now to FIG. 6B, in conjunction with FIGS. 1-5, if calendar client agent 106 detected a time a meeting is scheduled to occur that is earlier or later than the user's workday or some period of time (e.g., 8 am-6 pm) designated by the user, then, in step 608, calendar client agent 106 presents an object in the calendar application representing a time of day the meeting is scheduled to occur. For example, if the meeting is scheduled to occur very early the following morning, such as before the user starts his/her workday or prior to a period of time designated by the user, calendar client agent 106 may present a sun indicating an early meeting the following day. In another example, calendar client agent 106 may present a moon indicating a meeting that is to occur very late in the day, outside of the user's normal working hours. Upon the user selecting such objects, horizontal bar 400 scrolls to the start of the corresponding calendar entries. Such objects may assist the user in comprehending when a future meeting, such as the next meeting, is to occur thereby assisting the user in being prepared for the meeting. In one embodiment, such objects may also be used to represent a time a meeting is scheduled to occur during the user's workday.

Upon presenting an object on the calendar application representing a time of day the meeting is scheduled to occur, or if calendar client agent 106 did not detect a meeting scheduled to occur that is earlier or later than the user's workday or some period of time designated by the user, then, in step 609, calendar client agent 106 tracks the pattern of activity from the user (e.g., user of client device 101A) completing the items of the retrieved calendar information. For example, calendar client agent 106 may track the completion of scheduled meetings, appointments, tasks, vacations, etc. by the user throughout each day.

In step 610, calendar client agent 106 generates a reward based on the pattern of activity exhibited from completing the items of the retrieved calendar information. For example, badges may be earned for completion of a threshold number of scheduled meetings, appointments, tasks, vacations, etc. and presented at various intervals. In one embodiment, badges may be provided by another application.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The invention claimed is:

1. A method for improving the usability of a calendar application, the method comprising:
retrieving, by a processor, calendar information from three or more of the following systems: electronic mail, social networking, instant messaging, a wiki, a project management system and a customer relationship management system, wherein said calendar information comprises meetings, appointments, vacations and tasks;
evaluating said retrieved calendar information with respect to a set of presentation rules, wherein said set of presentation rules determines how said calendar information is to be displayed on a user interface of a client device;
presenting, by said processor, said retrieved calendar information in a horizontal bar in said calendar application over a duration of time in relation to said set of presentation rules, wherein said horizontal bar is limited to two rows on said user interface of said client device, wherein said presented calendar information comprises calendar information for a plurality of different users, wherein said horizontal bar displays a total availability of users to attend a meeting in response to a user selecting said meeting displayed in said horizontal bar;
presenting a zoom icon on said user interface of said client device allowing said user to zoom into a period of time of day depicted in said horizontal bar;
detecting a current time;
automatically scrolling to said current time in said horizontal bar such that items in said horizontal bar that occur prior to said current time are less visible than items in said horizontal bar that occur after said current time;
displaying an indication on said user interface of said client device when a meeting is to occur within a designated amount of time from said detected current time thereby drawing a user's attention to said meeting, wherein said indication comprises a countdown to a start of said meeting;
tracking a pattern of activity from said user completing items of said retrieved calendar information, wherein said items comprise scheduled meetings, appointments, tasks and vacations; and
generating a reward based on said tracked pattern of activity, wherein said reward comprises badges.

2. The method as recited in claim 1 further comprising:
prioritizing a view of said horizontal bar by assigning a highest priority to meetings that a user is required to attend followed by assigning a next highest priority to meetings that said user is optionally required to attend followed by assigning a lowest priority to meetings that were only sent to said user for the user's information in response to a first meeting and a second meeting having a conflict in their scheduled times and displaying said first meeting and said second meeting in said horizontal bar according to said prioritization, wherein a higher prioritized meeting is shown above a lower prioritized meeting in said horizontal bar, wherein said first and second meetings are displayed in said two rows on said user's interface of said client device.

3. The method as recited in claim 1 further comprising:
displaying three or more scheduled meetings as a merged block in said horizontal bar in response to said three or more meetings having a conflict in their scheduled times.

4. The method as recited in claim 1 further comprising:
detecting a time a meeting is scheduled to occur from said retrieved calendar information that occurs earlier or later than a user's workday or a period of time designated by said user; and
presenting an object in said calendar application representing a time of day said meeting is scheduled to occur, wherein said object comprises a sun indicating an early meeting a following day or a moon indicating a meeting that is to occur late in a day outside normal working hours of said user, wherein said object assists said user in comprehending when a future meeting is to occur.

5. The method as recited in claim 1 further comprising:
prioritizing a view of said horizontal bar by assigning a highest priority to meetings where said user is a chair of a meeting followed by assigning a second highest priority to meetings where said user is required to attend followed by assigning a third highest priority to meetings where said chair of said meeting is an individual whose meetings said user wants to attend followed by assigning a lowest priority to meetings when there are fewer than a threshold number of people attending; and
determining which meetings chaired by specific individuals said user desires to attend based on analyzing a social media homepage of said user.

6. The method as recited in claim 1 further comprising:
rescheduling a meeting in response to said user moving an edge of said horizontal bar over a border of another meeting.

7. The method as recited in claim 1 further comprising:
providing information in said horizontal bar to said user to join a meeting, wherein said information comprises a time of said meeting, a telephone number, a passcode and a link to launch a start of said meeting.

8. A computer program product for improving the usability of a calendar application, the computer program product comprising a computer readable storage medium having program code embodied therewith, the program code comprising the programming instructions for:
retrieving calendar information from three or more of the following systems: electronic mail, social networking, instant messaging, a wiki, a project management system and a customer relationship management system, wherein said calendar information comprises meetings, appointments, vacations and tasks;
evaluating said retrieved calendar information with respect to a set of presentation rules, wherein said set of presentation rules determines how said calendar information is to be displayed on a user interface of a client device;
presenting said retrieved calendar information in a horizontal bar in said calendar application over a duration of time in relation to said set of presentation rules, wherein said horizontal bar is limited to two rows on said user interface of said client device, wherein said presented calendar information comprises calendar information for a plurality of different users, wherein said horizontal bar displays a total availability of users to attend a meeting in response to a user selecting said meeting displayed in said horizontal bar;

presenting a zoom icon on said user interface of said client device allowing said user to zoom into a period of time of day depicted in said horizontal bar;

detecting a current time;

automatically scrolling to said current time in said horizontal bar such that items in said horizontal bar that occur prior to said current time are less visible than items in said horizontal bar that occur after said current time;

displaying an indication on said user interface of said client device when a meeting is to occur within a designated amount of time from said detected current time thereby drawing a user's attention to said meeting, wherein said indication comprises a countdown to a start of said meeting;

tracking a pattern of activity from said user completing items of said retrieved calendar information, wherein said items comprise scheduled meetings, appointments, tasks and vacations; and generating a reward based on said tracked pattern of activity, wherein said reward comprises badges.

9. The computer program product as recited in claim 8, wherein the program code further comprises the programming instructions for:

prioritizing a view of said horizontal bar by assigning a highest priority to meetings that a user is required to attend followed by assigning a next highest priority to meetings that said user is optionally required to attend followed by assigning a lowest priority to meetings that were only sent to said user for the user's information in response to a first meeting and a second meeting having a conflict in their scheduled times and displaying said first meeting and said second meeting in said horizontal bar according to said prioritization, wherein a higher prioritized meeting is shown above a lower prioritized meeting in said horizontal bar, wherein said first and second meetings are displayed in said two rows on said user's interface of said client device.

10. The computer program product as recited in claim 8, wherein the program code further comprises the programming instructions for:

displaying three or more scheduled meetings as a merged block in said horizontal bar in response to said three or more meetings having a conflict in their scheduled times.

11. The computer program product as recited in claim 8, wherein the program code further comprises the programming instructions for:

detecting a time a meeting is scheduled to occur from said retrieved calendar information that occurs earlier or later than a user's workday or a period of time designated by said user; and presenting an object in said calendar application representing a time of day said meeting is scheduled to occur, wherein said object comprises a sun indicating an early meeting a following day or a moon indicating a meeting that is to occur late in a day outside normal working hours of said user, wherein said object assists said user in comprehending when a future meeting is to occur.

12. The computer program product as recited in claim 8, wherein the program code further comprises the programming instructions for:

prioritizing a view of said horizontal bar by assigning a highest priority to meetings where said user is a chair of a meeting followed by assigning a second highest priority to meetings where said user is required to attend followed by assigning a third highest priority to meetings where said chair of said meeting is an individual whose meetings said user wants to attend followed by assigning a lowest priority to meetings when there are fewer than a threshold number of people attending; and determining which meetings chaired by specific individuals said user desires to attend based on analyzing a social media homepage of said user.

13. The computer program product as recited in claim 8, wherein the program code further comprises the programming instructions for:

rescheduling a meeting in response to said user moving an edge of said horizontal bar over a border of another meeting.

14. The computer program product as recited in claim 8, wherein the program code further comprises the programming instructions for:

providing information in said horizontal bar to said user to join a meeting, wherein said information comprises a time of said meeting, a telephone number, a passcode and a link to launch a start of said meeting.

15. A system, comprising:

a memory unit for storing a computer program for improving the usability of a calendar application; and a processor coupled to the memory unit, wherein the processor is configured to execute the program instructions of the computer program comprising:

retrieving calendar information from three or more of the following systems: electronic mail, social networking, instant messaging, a wiki, a project management system and a customer relationship management system, wherein said calendar information comprises meetings, appointments, vacations and tasks;

evaluating said retrieved calendar information with respect to a set of presentation rules, wherein said set of presentation rules determines how said calendar information is to be displayed on a user interface of a client device;

presenting said retrieved calendar information in a horizontal bar in said calendar application over a duration of time in relation to said set of presentation rules, wherein said horizontal bar is limited to two rows on said user interface of said client device, wherein said presented calendar information comprises calendar information for a plurality of different users, wherein said horizontal bar displays a total availability of users to attend a meeting in response to a user selecting said meeting displayed in said horizontal bar;

presenting a zoom icon on said user interface of said client device allowing said user to zoom into a period of time of day depicted in said horizontal bar;

detecting a current time;

automatically scrolling to said current time in said horizontal bar such that items in said horizontal bar that occur prior to said current time are less visible than items in said horizontal bar that occur after said current time;

displaying an indication on said user interface of said client device when a meeting is to occur within a designated amount of time from said detected current time thereby drawing a user's attention to said meeting, wherein said indication comprises a countdown to a start of said meeting;

tracking a pattern of activity from said user completing items of said retrieved calendar information, wherein said items comprise scheduled meetings, appointments, tasks and vacations; and generating a reward based on said tracked pattern of activity, wherein said reward comprises badges.

16. The system as recited in claim 15, wherein the program instructions of the computer program further comprises:

prioritizing a view of said horizontal bar by assigning a highest priority to meetings that a user is required to attend followed by assigning a next highest priority to meetings that said user is optionally required to attend followed by assigning a lowest priority to meetings that were only sent to said user for the user's information in response to a first meeting and a second meeting having a conflict in their scheduled times and displaying said first meeting and said second meeting in said horizontal bar according to said prioritization, wherein a higher prioritized meeting is shown above a lower prioritized meeting in said horizontal bar, wherein said first and second meetings are displayed in said two rows on said user's interface of said client device.

17. The system as recited in claim 15, wherein the program instructions of the computer program further comprises:

displaying three or more scheduled meetings as a merged block in said horizontal bar in response to said three or more meetings having a conflict in their scheduled times.

18. The system as recited in claim 15, wherein the program instructions of the computer program further comprises:

detecting a time a meeting is scheduled to occur from said retrieved calendar information that occurs earlier or later than a user's workday or a period of time designated by said user; and presenting an object in said calendar application representing a time of day said meeting is scheduled to occur, wherein said object comprises a sun indicating an early meeting a following day or a moon indicating a meeting that is to occur late in a day outside normal working hours of said user, wherein said object assists said user in comprehending when a future meeting is to occur.

19. The system as recited in claim 15, wherein the program instructions of the computer program further comprises:

rescheduling a meeting in response to said user moving an edge of said horizontal bar over a border of another meeting.

20. The system as recited in claim 15, wherein the program instructions of the computer program further comprises:

providing information in said horizontal bar to said user to join a meeting, wherein said information comprises a time of said meeting, a telephone number, a passcode and a link to launch a start of said meeting.

* * * * *